United States Patent

[11] 3,573,657

[72] Inventors: Barry R. Bronfin, Weathersfield; Daniel J. Seery, Glastonbury, Conn.
[21] Appl. No.: 786,484
[22] Filed: Dec. 23, 1968
[45] Patented: Apr. 6, 1971
[73] Assignee: United Aircraft Corporation, East Hartford, Conn.

[54] NITROGEN-PHOSPHINE LASER (U)
4 Claims, 1 Drawing Fig.

[52] U.S. Cl. .................................................. 331/94.5, 330/4.3
[51] Int. Cl. .................................................. H01s 3/22
[50] Field of Search .................................. 331/94.5; 330/4.3 (Abstracts)

[56] References Cited
OTHER REFERENCES

Patel: Selective Excitation Through Vibrational Energy Transfer and Optical Maser Action in $N_2$-$CO_2$. Physical Review Letters Vol. 13. No. 21 Nov. 1964 pp 617—619.

Primary Examiner—Rodney D. Bennett, Jr.
Assistant Examiner—Daniel C. Kaufman
Attorney—Melvin Pearson Williams ABSTRACT: A gas laser utilizes vibrationally excited nitrogen as an energizing gas and, through resonant collisions with a lasing gas, transfers the energy to the lasing gas, preferentially to an upper laser energy level. The lasing gas is phosphine, which is preferably introduced directly into the laser cavity free of prior excitation so as to avoid molecular dissociation. Laser energy at 8.3, 7.5 and 30.0 microns is produced.

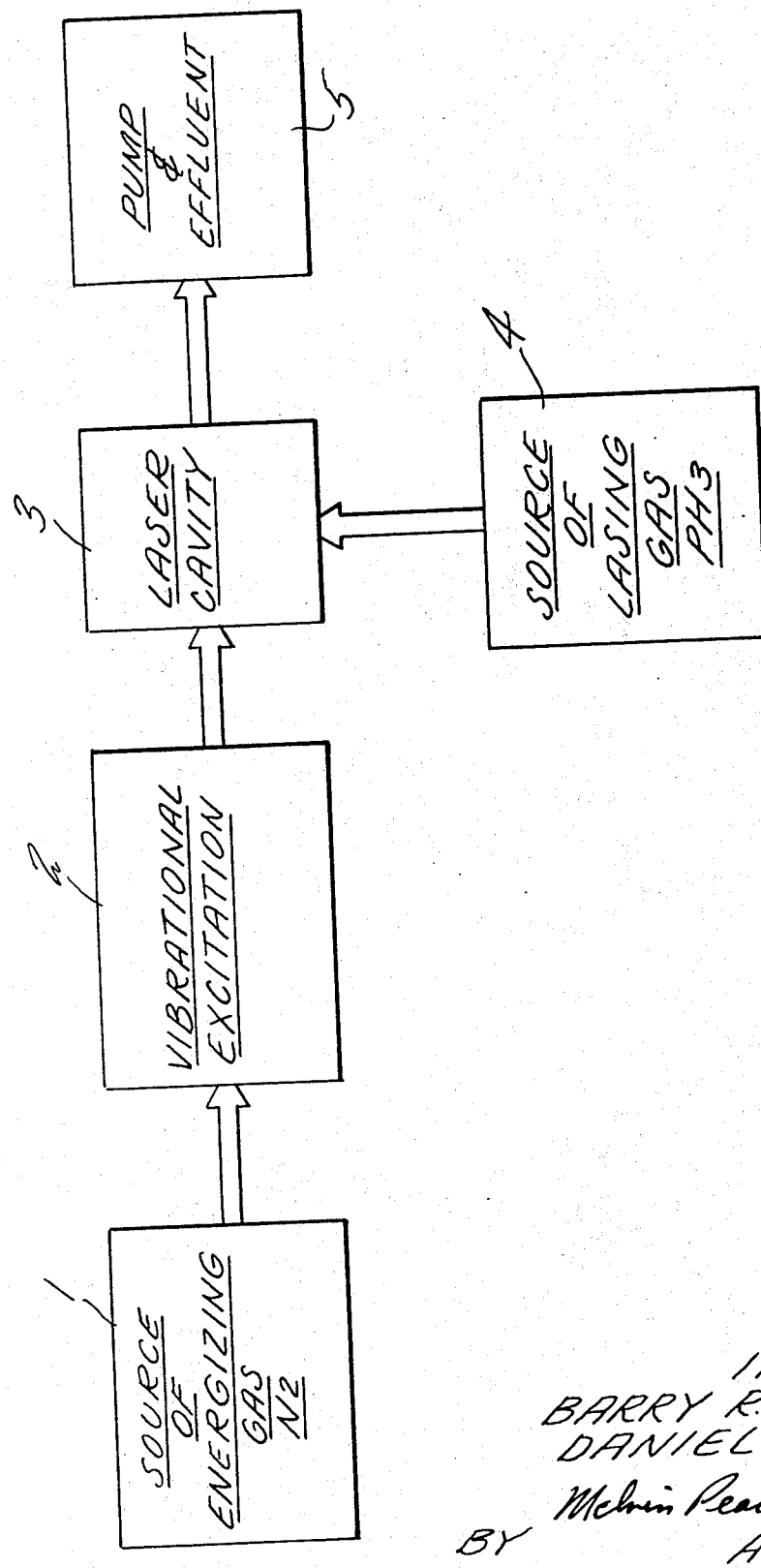

3,573,657

NITROGEN-PHOSPHINE LASER (U)

BACKGROUND OF THE INVENTION

1. Field of the Invention

This invention relates to gas lasers, and more particularly to a gas laser for producing radiation in the infrared.

2. Description of the Prior Art

The mechanics of gas lasers are currently well-known. A great deal of attention has been paid recently to the excitation of a lasing gas to an energy level capable of emitting photons and thereby participating in stimulated emission of coherent light within a laser cavity as a result of energy preferentially transferred to the lasing gas through near-resonant collision with a vibrationally excited energizing gas. One type of gas laser which has received a great deal of attention is the nitrogen-carbon dioxide laser. In this type of gas laser, the nitrogen is excited to the first vibrational level, and it transfers energy into the upper laser level (001) of carbon dioxide preferentially, so as to provide a population inversion which supports laser emission. The emission of photons by the carbon dioxide causes the molecules thereof to assume the energy of the lower laser level (100) and molecules in this energy level rapidly decay via gas collisions to the ground state.

The method of exciting the energizing gas may vary in accordance with the particular design parameters of a given laser, as is known in the art. For instance, electric excitation may be utilized in any of several forms. One well-known form is radiofrequency excitation; another form is direct current plasma excitation; and a third known form is microwave excitation. Additionally, it is possible to excite the energizing gas by causing it to absorb intense light of a frequency matched to the spacing of the low-lying vibrational energy levels of the energizing gas. For instance nitrogen may be raised to its first vibrational level by absorption of light with a wavelength of about 4.3 microns, and carbon monoxide may be raised to its first vibrational energy level by absorption of light with a wavelength of about 4.7 microns. Another known method of obtaining energizing gas in an excited state comprises the sudden cooling of a heated energizing gas. Thus, the energizing gas may be heated as a result of the utilization of any thermal source (such as the simple burning of fuel) or be a heating arc, and it may thereafter be caused to flow through an expansion nozzle at supersonic speeds so as to freeze the energy in the lower vibrational levels while translational cooling takes place, thus providing a highly nonequilibrium population distribution with preferential excitation at these levels. In the preferred embodiment of the invention, gas temperatures equal to 1,000° K. or greater will be achieved in the energizing gas before expansion.

A recent advancement in the art comprises the technique of mixing, wherein the lasing gas is caused to mix intimately with the vibrationally excited energizing gas directly within the laser cavity to accomplish population inversion in the lasing gas so that the energizing of the lasing gas to its upper laser level or levels does not cause prelasing, and is not depleted by collisional energy transfers or other adiabatic phenomena prior to entrance into the laser cavity where the energy may participate in the generation of laser light.

In the aforementioned gas lasers, the wavelength of the laser radiation obtained depends upon the laser transitions between various energy levels. A great deal of work has been done with the carbon dioxide laser which produces laser light at 10.6 microns, and with other laser systems which produce light at various other wavelengths. These are well suited to some uses, but atmospheric absorption of light at certain frequencies limits their usefulness. Additionally, laser energy may be utilized for useful processes, in which it becomes important to stimulate chemical reactions and other molecular transitions, provided that light of a proper wavelength can be obtained (a well-known process called photolysis).

It should be understood that the laser emission occurs over a band of wavelengths approximately centered on the wavelengths listed. Furthermore, due to uncertainties existing in the present art, only approximate assignments of these laser wavelengths can be made.

SUMMARY OF INVENTION

The object of the present invention is to provide a laser capable of radiation at infrared wavelengths.

According to the present invention, nitrogen is utilized as an energizing gas to vibrationally excite phosphine to an upper laser level in a gas laser, whereby stimulated coherent emission of electromagnetic radiation or laser energy will result at an infrared wavelength.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

The sole FIGURE herein comprises a schematic block diagram of a laser system in accordance with the present invention.

DESCRIPTION OF THE PREFERRED EMBODIMENT

Referring now to the FIGURE, a source 1 of molecular nitrogen energizing gas delivers the gas to a vibrational excitation means 2. The vibrational excitation means 2 may comprise an electronic discharge of either the direct current, radio frequency, or microwave variety, as is known in the art. It may on the other hand comprise a source of intense light of approximately 4.3 microns. It may also comprise means for thermally heating the energizing gas and for thereafter suddenly cooling it, such as by passing it through a rapid expansion nozzle to freeze the vibrational energy states. All of these techniques are well-known in the art, and the choice of one of them is not germane to the present invention.

The vibrationally excited energizing gas passes from the vibrational excitation means 2 into a laser cavity 3 which also receives phosphine from a source 4 of lasing gas. The lasing gas is preferably introduced into the laser cavity at a relatively low temperature, such as room temperature. Methods of accomplishing efficient mixing of gases are known in the art. This causes intimate mixing of the vibrationally excited energizing gas with the lasing gas within the optical cavity so that essentially each molecule of lasing gas which is brought to an upper laser level of energy will emit photons directly within the laser cavity, therefore avoiding prelasing or spontaneous vibrational adiabatic equilibration processes which would remove molecules of lasing gas from the upper laser level of excitation by other than the emission of a photon. Additionally, the use of the mixing configuration illustrated in the FIGURE is preferred because phosphine is a relatively fragile molecule, since the dissociation of the P-H bond is 76.4 kcal/gm/mol. Hence it would in general be deleterious to have phosphine accompany the nitrogen in the excitation stage where chemical decomposition of the phosphine might ensue.

The flow of the gas from the source 1, through the vibrational excitation means 2 and the laser cavity 3 is caused by a suitable pump and effluent control means 5. The pump and effluent control means 5 may provide not only for flow through the system, but supersonic flow in the case where an expansion nozzle is utilized, or high flow at relatively low pressure in the case where an electric discharge is involved in the vibrational excitation means 2. The pump and effluent control means 5 may also provide for the combustion of the effluent so as to avoid releasing toxic phosphine. As an alternative, however, a leaktight closed cycle system may be employed if desired, without altering the practice of the essential teachings of the present invention.

The technique of mixing the preferably room-temperature lasing gas into the excited energizing gas promotes a favorable energy transfer process leading to excited state population inversion as exemplified by the following energy transfer process:

$$N_2(v=1) + PH_3(0000) \rightarrow N_2(v=0) + PH_3(0010), \Delta E = 3.0 \text{ cm}^{11}$$

The near-resonant exchange process, stated above, has an energy defect of only 3.0 cm[11]. For comparison one should note that the highly successful $N_2/CO_2$ pumping reaction has a much larger energy defect of 18 cm[11]. Hence, the selective pumping of the 0010 level in $PH_3$ via resonant $N_2^*/PH_3$ collisions is very efficient and a vibrational-state population inversion is established within the $PH_3$ molecules. Within an optical cavity, self-sustained lasing between the 0010 and lower vibrational levels in $PH_3$ results.

The resulting laser transitions are as follows:

| Upper level | Lower level | $E\Delta=$ cm.$^{-1}$ | Approximate wavelength, $\mu$ |
|---|---|---|---|
| 0010 | 0001 | 1,206 | 8.3 |
| 0010 | 0100 | 1,336 | 7.5 |
| 0010 | 0200 | 334 | 30.0 |

The desirable depletion of lower laser levels can be enhanced through the addition of other gases which are efficient agents for transferring vibrational energy to translational energy, such as He, $H_2$, $H_2O$. However, the $PH_3$ molecule itself exhibits high vibrational energy transfer efficiency, so that the need for relaxing additives is minimal.

To produce self-sustained lasing in the flow, a highly-polished mirror cavity should be provided to "view" the mixing region of the flow. This cavity should be coextensive with the region of flow containing a finite excited state population inversion density.

From the foregoing laser transitions, it can be seen that the present invention will provide laser radiation at TWO wavelengths which are not significantly absorbed in the atmosphere. These are in the vicinity of 8.3 and 7.5 microns. Additionally, the present invention provides light of a wavelength which is well suited to particular uses not requiring extensive transmission through the atmosphere.

Although the invention has been shown and desired with respect to preferred embodiments thereof, it should be understood by those skilled in the art that various changes and omissions in the form and detail thereof may be made therein, without departing from the spirit and the scope of the invention.

We claim:
1. The method of operating a gas laser having a laser cavity comprising:
   flowing an energizing gas through said cavity, said energizing gas consisting of vibrationally excited molecular nitrogen; and
   contacting a second gas stream with said energizing gas in the laser cavity, the second gas stream consisting of a lasing gas which is predominantly phosphine, whereby the energy of said energizing gas is transferred to the lasing level of the lasing gas.
2. In the method according to claim 1, the further step which comprises; adjusting the optical parameters of said laser cavity so as to provide laser radiation over a band of wavelengths approximately centered at 30.0 microns.
3. In the method according to claim 1, the further step which comprises; adjusting the optical parameters of said laser cavity so as to provide laser radiation over a band of wavelengths approximately centered at 8.3 microns.
4. In the method according to claim 1, the further step which comprises; adjusting the optical parameters of said laser cavity so as to provide laser radiation over a band of wavelengths approximately centered at 7.5 microns.